United States Patent
Biswas

(10) Patent No.: US 10,769,356 B2
(45) Date of Patent: Sep. 8, 2020

(54) SYNCHRONIZING REVIEW COMMENTS BETWEEN SOURCE AND SHARED DOCUMENTS

(71) Applicant: Adobe Inc., San Jose, CA (US)

(72) Inventor: Sanjeev Kumar Biswas, Bangalore (IN)

(73) Assignee: Adobe Inc., San Jose, CA (US)

(*) Notice: Subject to any disclaimer, the term of this patent is extended or adjusted under 35 U.S.C. 154(b) by 292 days.

(21) Appl. No.: 15/448,721

(22) Filed: Mar. 3, 2017

(65) Prior Publication Data
US 2018/0253412 A1 Sep. 6, 2018

(51) Int. Cl.
*G06F 40/169* (2020.01)
*H04L 29/08* (2006.01)
*H04L 29/06* (2006.01)
*G06F 40/134* (2020.01)

(52) U.S. Cl.
CPC .......... *G06F 40/169* (2020.01); *G06F 40/134* (2020.01); *H04L 65/4015* (2013.01); *H04L 67/10* (2013.01); *H04L 67/1095* (2013.01); *H04L 67/12* (2013.01)

(58) Field of Classification Search
CPC .. G06F 17/241; G06F 17/2235; G06F 40/169; G06F 40/134; H04L 41/20; H04L 67/1095; H04L 65/403; H04L 67/12; H04L 67/10; H04L 65/4015
See application file for complete search history.

(56) References Cited

U.S. PATENT DOCUMENTS

| | | | |
|---|---|---|---|
| 9,667,676 B1* | 5/2017 | Lo | H04L 65/4015 |
| 2003/0182450 A1* | 9/2003 | Ong | G06F 16/93 709/246 |
| 2005/0262051 A1* | 11/2005 | Dettinger | G06F 16/24573 |
| 2006/0080598 A1* | 4/2006 | Bargeron | G06F 17/241 715/232 |
| 2008/0252932 A1* | 10/2008 | Baer | G06F 17/2288 358/400 |
| 2009/0125518 A1* | 5/2009 | Bailor | G06F 17/24 |
| 2009/0172041 A1* | 7/2009 | Clarke | G06F 16/172 |

(Continued)

*Primary Examiner* — Stephen S Hong
*Assistant Examiner* — Ahamed I Nazar
(74) *Attorney, Agent, or Firm* — Finch & Maloney PLLC

(57) ABSTRACT

Techniques are provided for synchronizing comments between a platform-dependent source document and a platform-independent shared document created from the source document. The shared document can accept feedback, edits, annotations, and other comments (all generally referred to herein as comments) from a variety of platforms and collaborators. The comments entered in the shared document automatically become part of, or otherwise become visible from, the source document. In an embodiment, the techniques are implemented as a computer-driven methodology that includes creating a logical link between the source and shared documents. This link is based on unique IDs of the respective documents, and is used to determine that reviewer comments have been made in the shared document. In response to the source document being open on a given source tool, periodic polling for reviewer comments is carried out and any new comments made in the shared document are displayed in the source tool.

20 Claims, 8 Drawing Sheets

(56) References Cited

U.S. PATENT DOCUMENTS

| | | | |
|---|---|---|---|
| 2009/0249224 A1* | 10/2009 | Davis | G06Q 10/10 |
| | | | 715/753 |
| 2009/0271696 A1* | 10/2009 | Bailor | G06F 16/954 |
| | | | 715/229 |
| 2012/0278276 A1* | 11/2012 | Bailor | G06F 17/24 |
| | | | 707/608 |
| 2013/0091419 A1* | 4/2013 | Caliman | G06F 17/241 |
| | | | 715/236 |
| 2013/0124967 A1* | 5/2013 | Hatfield | G06F 8/10 |
| | | | 715/232 |
| 2014/0279846 A1* | 9/2014 | Srinivasan | G06F 16/93 |
| | | | 707/608 |
| 2018/0173378 A1* | 6/2018 | Tinari | G06F 17/2288 |
| 2018/0219923 A1* | 8/2018 | Berger | G06Q 10/101 |

* cited by examiner

US 10,769,356 B2

SYNCHRONIZING REVIEW COMMENTS BETWEEN SOURCE AND SHARED DOCUMENTS

FIELD OF THE DISCLOSURE

This disclosure relates to synchronizing review comments between a platform-dependent source document and a platform-independent shared document, such as a portable document format (PDF) document, created from the source document.

BACKGROUND

Authors and developers use platform-dependent development tools to create source documents for text-based, multimedia, and other graphical content-related projects. Reviewers and other developers of these source documents take advantage of platform-independent collaboration tools that create corresponding shared documents that are renditions of the source documents but in a more common format. The more common format is generally less constrained by the platform restrictions of the development tool that created the given source document. Thus, the shared documents can accept comments from a variety of platforms. However, comments entered in the shared documents do not automatically become part of, or become visible from, the source documents. Accordingly, the author of a source document has to open both the source document and the corresponding shared document, and go back and forth between them to manually incorporate comments from the shared document to the source document. This can be a cumbersome and error-prone procedure, as comments can be overlooked or not incorporated as intended.

DETAILED DESCRIPTION

Figure 1:
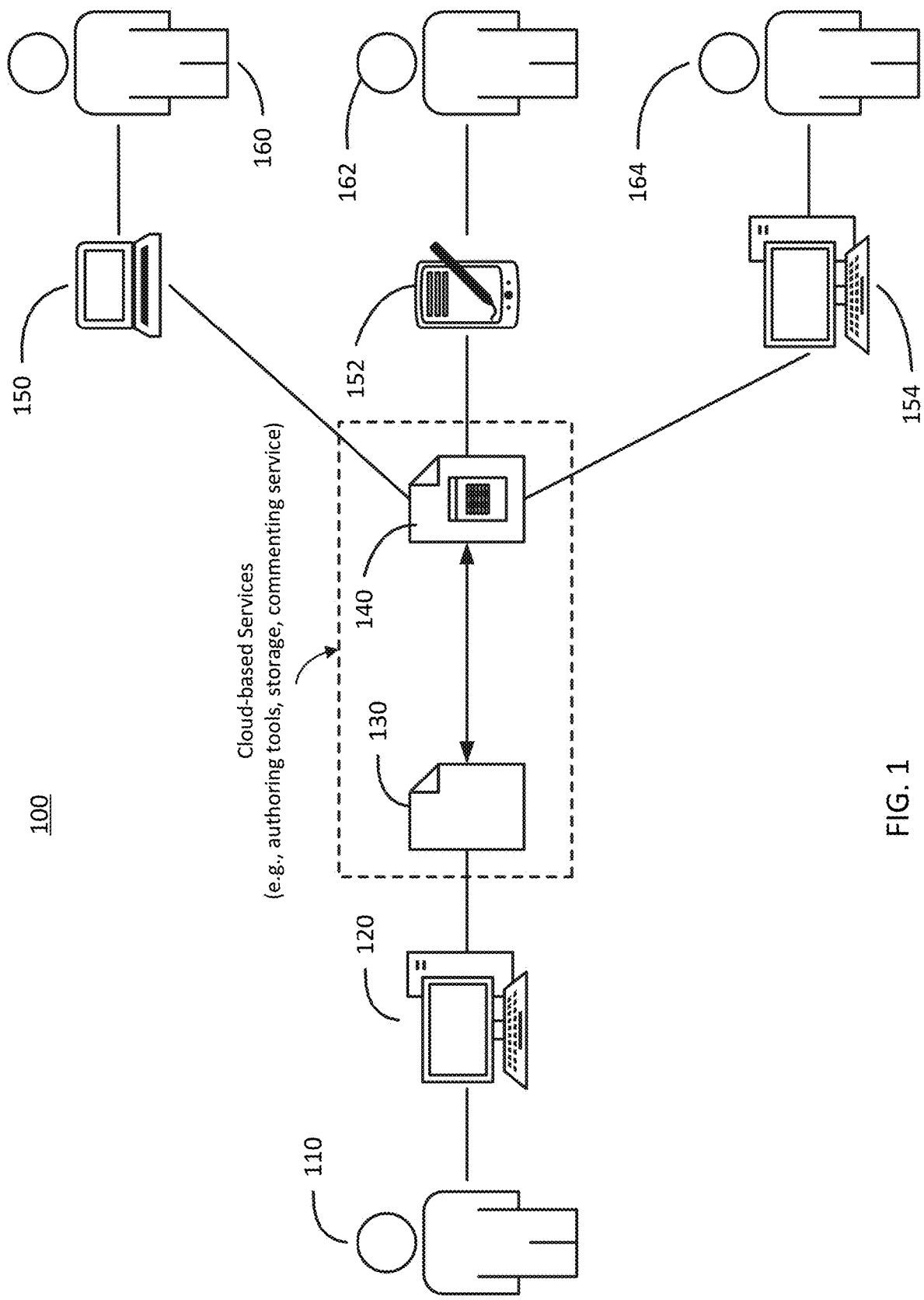
FIG. 1 is a schematic diagram of an example environment for synchronizing review comments between a source document and a shared document created from the source document, the review comments provided by multiple reviewers, according to an embodiment of the present disclosure.

Techniques are provided for synchronizing review comments between a platform-dependent source document and a platform-independent shared document created from the source document. The shared document can accept feedback, edits, annotations, and other comments (all generally referred to herein as comments) from a variety of platforms and collaborators. The comments entered in the shared document automatically become part of, or become visible from, the source document. Thus, the need for manual incorporation of comments from the shared document to the source document is avoided. In accordance with an embodiment, the techniques are implemented as a computer-driven method that includes creating a logical link between an original or native document (e.g., the source document) and the exported or shared document, such as a PDF document, although any number of other suitable formats can be used for the shared document. This linking between the native document and the shared document makes it possible for any addition, deletion, or modification of one or more review comments in either the native document or the shared document to be automatically synchronized between the two documents. This means that the addition, deletion, or modification becomes part of both the native document and the shared document, or can otherwise readily be viewed in the target document. As such, the author of the native document using the source tool sees a similar set of comments to those comments in the shared document seen by the reviewers using the collaboration tool(s).

In further detail, there are various authoring or developer tools (e.g., Adobe InDesign, Adobe Illustrator, Adobe Photoshop, to name a few examples, although numerous others will be apparent) for creating digital source documents, such as drawings, photographs, presentations, publications, and other digital media. The source documents created by these originating tools are created as so-called platform-dependent files. This generally means that the source documents can only be opened or edited through their corresponding originating tools or platforms that created them. For example, source or native files can have particular formats and corresponding file extensions, such as INDD for Adobe InDesign, AI for Adobe Illustrator, and PSD for Adobe Photoshop. Source developers (or authors) are responsible for maintaining such documents on the originating tools and platforms. However, other developers and reviewers may also be responsible for or contribute to the content of these source documents, but do not necessarily have access to the corresponding originating tools or platforms. For example, commissioned artwork can be developed on a graphical design platform by a graphical artist or author, and need to be reviewed by the contracting party prior to any publication or other delivery of the artwork. While the graphical artist may subscribe to a given graphical design platform (e.g., a set of in-cloud services provided at a monthly premium), the contracting party may not have such a subscription.

Accordingly, the graphical artist can export the source document to another document having a format that can be accessed and manipulated by a more commonly available set of collaboration tools. The rendition of the source document exported from the source tool is visually similar to the source document, and generally referred to herein as the shared document. Collaboration tools, such as Adobe Acrobat, provide a degree of platform-independence and allow a shared document (e.g., PDF document) exported from a subscription-based or otherwise restricted platform to be reviewed. Further, the developers, reviewers, and other collaborators have access to the collaboration tools. The collaboration tools can be used to access the content of the shared document, which allows a collaborator to see the content of the source document in a form similar to that presented by the originating (source) tool. Through the shared document, the collaboration tool can be used to display and modify the rendition of the source document on a variety of computing systems, such as desktop computers, smartphones, etc., including their corresponding operating systems and other interfaces. In addition, the collaboration tools can receive and display feedback and other comments from reviewers on the renditions. Thus, while the collaborator may not have access to the source platform which was used to originate the source document from which the shared document was rendered, the collaborator can still review the shared document as desired.

A comment can be, for example, a statement (e.g., sentence, clause, or other textual expression) and a corresponding location (e.g., object, text, or set of coordinates) to which the comment is directed in the document being reviewed. In a broader sense, a comment can be its own content (e.g., graphics, speech, video, text, or other user input) and a location (to give it context) within the source or shared document file. Note that the "location" of a comment as used herein refers to the portion of the document to which the comment is directed, which is not necessarily the location where the comment is displayed. For example, depending on the review commenting service and its corresponding graphical user interface (GUI), comments may appear as a list of text strings or other content on the side of a displayed version of the document. Further, selecting a particular comment can cause the corresponding location of the comment to appear as a highlighted portion of the displayed document.

Comments can include other attributes, such as their author, the time they were posted, and whether they are a reply to an earlier comment (and thus share the same location), for example. Accordingly, comments can be thought of as having content (e.g., multimedia and attributes) and a location. Comments can be entered in collaboration tools, such as privately (e.g., each reviewer maintaining their own shared document), publicly (e.g., web-based, with one shared document on a server and individual reviewer's comments being stored on the server and visible to all), or a combination (e.g., web-based, with some reviewers working directly with the shared document on the server and other reviewers reviewing privately and sending their comments to the author, who can then export them to the server copy). In a more general sense, any suitable comment-provisioning scheme can be used.

Regardless of technique for providing the comments within the collaboration tools, there are corresponding tools that synchronize the comments between the reviewers, such as scheduled or manual refreshes. In this regard, authors and reviewers have a lot of flexibility in carrying out reviews; they can be tightly coupled (with each reviewer's comments appearing in near real time on the others' displays), loosely coupled (with each reviewer's comments eventually appearing on others' displays, but subject to inconsistent delays, such as whether a reviewer maintains a private copy of the shared document and updates comments only in batches and on their schedule), or somewhere in between. Regardless of how tightly synchronized this commenting is with respect to the shared document, the comments still exist on the shared document using the one or more collaboration tools, and are not available to the author on the source tool.

It should be further noted that source documents usually exist in versions, with different versions of the same source document possibly having different content, the versions representing the development of the source document over time. Likewise, shared documents can represent specific versions of the corresponding source document, each shared document being created (e.g., generated or exported) from a specific version of the source document. The relationship can be one-to-many, however, in that a single version of the source document can have multiple shared documents, each shared document being a different review of that version of the source document (e.g., a different set of reviewers, a different time period, a different aspect under review). All these shared documents can be active at any given time. Accordingly, a particular shared document is associated with a particular review and a particular version of a source document.

Thus, through the collaboration tools and the corresponding shared documents, developers and other interested parties can take part (e.g., review and offer comments) in the development of the source documents without accessing the source files through their corresponding originating tools, with these comments eventually being visible to all the reviewers taking part in the same review of the source document. For example, through a shared document, a collaboration tool allows feedback, edits, annotations, and other such reviewing comments by developers and other interested parties of a source document that can be shared between developers or other users of the source document. However, the comments reside in the shared document and are only accessible through the collaboration tool, which makes it cumbersome for developers (e.g., the source developers) to modify the source document to incorporate the comments using the originating tool. Rather, as previously explained, the source developers (or authors) have to open both the shared document on the collaboration tool and the source document on the originating tool, and go back and forth between the two documents to incorporate the comments. This is true for both group reviews (more than one reviewer) and private reviews (only one reviewer). This is awkward and increases the likelihood that some of the comments do not get incorporated, or get incorporated improperly, in the appropriate source document.

As such, in one or more embodiments of the present disclosure, a logical link is created between the source document being reviewed and its corresponding shared document. Once linked, comments entered in the source document (e.g., by the author or source developer) and comments entered in the shared document (e.g., by the reviewers or other developers) are automatically synchronized (e.g., made to appear concurrently) between the source document and the shared document. Examples of how this linking is carried out and related techniques are described in further detail below and in the accompanying drawings.

For ease of description, the disclosed techniques are described primarily from the perspective of an example development platform (Adobe Creative Cloud), an example development or authoring tool within that platform (Adobe InDesign), and an example collaboration tool (Adobe Acrobat). Any number of other development platforms, authoring tools, and collaboration tools can be used as well, as will be appreciated in light of this disclosure. The reviews are described primarily as web-based, e.g., a server-based copy of the comments that all can see concurrently. For further ease of description, these techniques are also described from the perspective of two-dimensional graphical content. However, other embodiments are not limited to any particular platform, tools, content, or degree of coupling of the review (e.g., how soon one reviewer's comments are seen by others), as will be apparent in light of the present disclosure. Numerous other platforms and tools will be apparent in light of this disclosure.

FIG. 1 is a schematic diagram of an example environment 100 for synchronizing review comments between a source document and a shared document created from the source document and that is being reviewed by multiple reviewers, according to an embodiment of the present disclosure. In FIG. 1, an author 110 creates or opens a source document 130 on a local workstation 120 that is running a copy of the source tool. The author 110 desires a review of the source document 130, so the source document 130 is exported to a shared document 140 using the source document authoring tool. Both the source document 130 and the shared document 140 can be accessibly stored in a cloud-based storage, as generally depicted by a dash-line box referred to as cloud-based services.

Reviewers 160, 162, and 164 are chosen for the review (e.g., by the author 110) and review the shared document 140 using a local version of the collaboration tool on their computer systems, for example, laptop computer 150, personal digital assistant (or smartphone) 152, and desktop computer 154, respectively. The reviewers 160, 162, and 164 make comments to the shared document 140, which are then synchronized with the source document 130 so that the author 110 sees the comments in the source document 130 when the source document is displayed on the local workstation 120 using the source document authoring tool. The comments may be shown, for example, in a comment viewing panel or as an overlaying window provisioned in the source document authoring tool, and/or integrated into the source document 130 itself at the same location where the reviewer provided it in the shared document. The comments may be made, for example, via a server accessible via a communications network (e.g., so-called cloud-based collaboration). In some cases, the comments may be posted and therefore seen in real time or near real time by others. Alternatively, each reviewer may maintain their own private copy of the shared document, with comments from each reviewer being periodically or occasionally submitted to the author, and other reviewers' versions of the shared document eventually updated to incorporate these comments.

Figure 2:
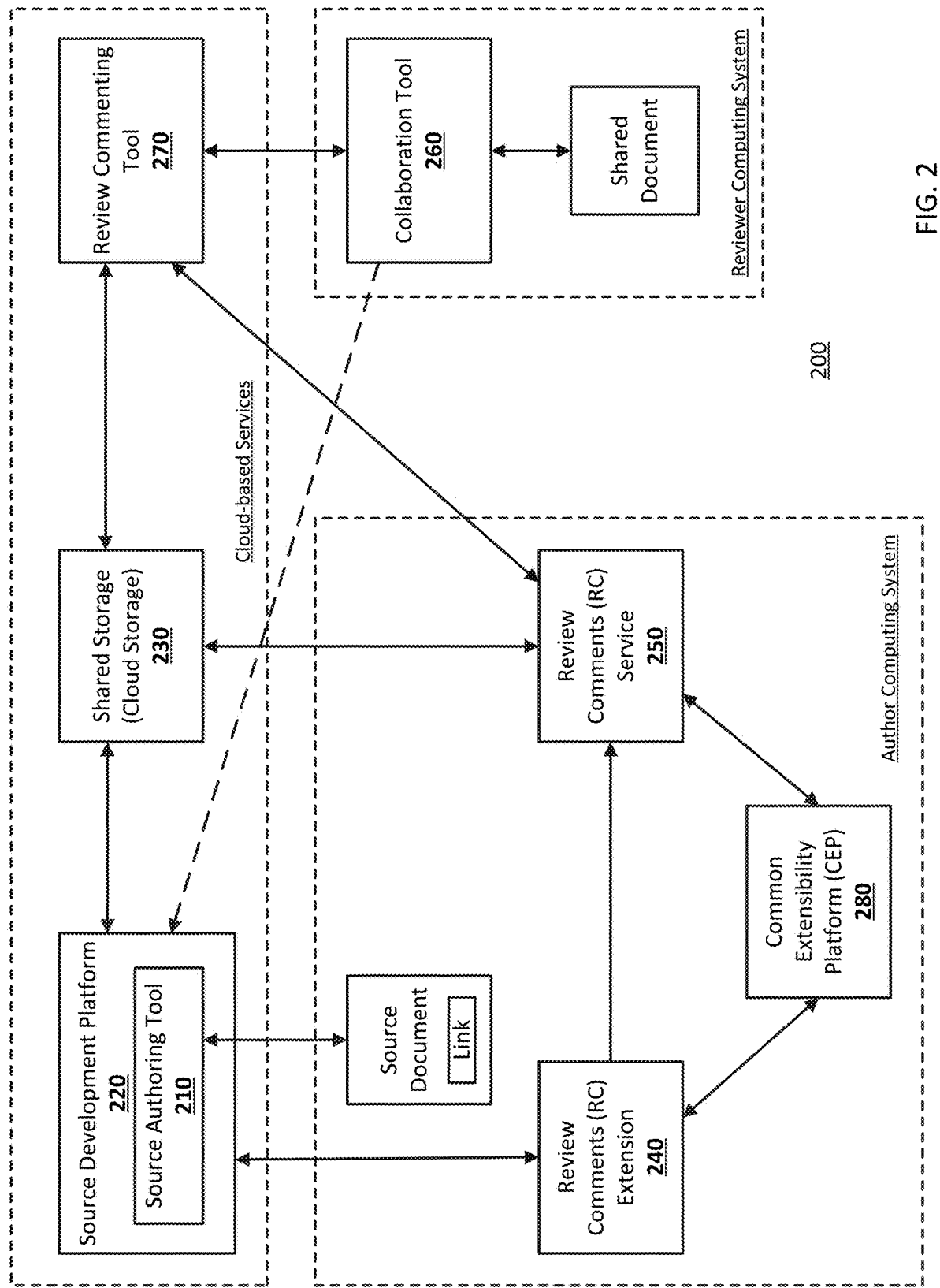
FIG. 2 is a block diagram of an example system for synchronizing review comments between a source document and a shared document created from the source document, according to an embodiment of the present disclosure.

FIG. 2 is a block diagram of an example system 200 for synchronizing review comments between a source document and a shared document created from the source document, according to an embodiment of the present disclosure. As can be seen, each of the functional blocks is generally assigned or allocated to one of an author computing system, a reviewer computing system, and cloud-based resources. As will be appreciated, such allocation refers to one example embodiment, and other embodiments may have different allocations. For example, the RC Service 250 and/or CEP 280 may be part of the cloud-based services in other embodiments. Likewise, at least a user interface portion of the source authoring tool 210 is allocated to (or otherwise executes on) the author computing system, according to some embodiments. In a more general sense, given the nature of cloud-based computing, numerous embodiments will be apparent, where some or all of a given functional block may be executed or otherwise carried out exclusively on the cloud-side (on server computing system), or exclusively on the client-side (on author/reviewer computing system), or partly on each of the cloud-side and client-side computing systems. Factors such as efficient use of computing resources, promised quality of service (QOS), and available processing power can be considered in determining such allocations and offloading of processing. Each of the functional blocks represents a computing tool or entity that can be implemented in a combination of hardware and software, such as a computer processor and software or firmware instructions together with a nonvolatile storage device (such as a magnetic or solid-state drive, or other non-transitory storage medium) for storing data, documents, and computer instructions or code. In addition, each of the connectors between the blocks represents a logical or physical connection (e.g., logic path, data flow) between components. A dashed connector generally refers to an optional connection, although such depiction is not to be understood as limiting solid connectors to be non-optional. To this end, it will be appreciated that data can arrive at a given location from multiple pathways (whether directly between two blocks, or through some intervening block), and any depicted connectors simply refer to one example connection scheme—numerous others will be apparent in light of this disclosure.

Source authoring tool 210 is a desktop publishing application on which an author creates a source document (e.g., for the Adobe InDesign authoring tool, the source document would be an INDD document). Source development platform 220 is a cloud-based software development platform (e.g., Adobe Creative Cloud) for supplying software tools as needed (versus each user having to manage individual tools on each computing system), and in this example embodiment includes source authoring tool 210. Shared storage 230 is a cloud-based storage for storing files and the like for each of the different users (e.g., authors, developers, and reviewers) of the system 200. In this example embodiment, shared storage 230 is further responsible for creating or otherwise assigning an asset ID to each document stored therein, as well as to each document stored in storage of platform 220 and storage of review commenting tool 270. An asset ID can be any unique identifier, as will be appreciated (e.g., binary code, vector, text label, hash function, to name a few examples). In any case, and as will be explained in turn, such asset IDs can be used to form a logical link which is in turn stored in the source document and used to facilitate synchronization of comments provided in a shared document back to the source document. According to an embodiment, shared storage 230 can be, for example, Adobe Shared Cloud, which can be used to generate and assign asset IDs to given files and manage storage of those files created from the Adobe Creative Cloud suite of tools, or other suitable source development platform 220.

Review Comments (RC) Extension 240 is an extension of source tools provided by platform 220, like source authoring tool 210. According to some embodiments, RC Extension 240 is configured to integrate and display (on the author's computer) review comments from other developers that were created using a collaboration tool 260 on other platforms distinct from platform 220, as well as accept and display comments from the author developed on source authoring tool 210, all in a format similar to that displayed by the collaboration tool. In an example embodiment, RC Extension 240 is a common extensibility platform (CEP) extension that runs with, for instance, authoring tools such as Adobe InDesign and Adobe Illustrator, and offers a user handling workflow to perform review commenting on a native source document (e.g., Adobe InDesign INDD file, or Adobe Illustrator AI file). Review Comments (RC) Service 250 can run as a background process on the user's machine and is responsible for interacting with a review commenting tool 270 and for synchronizing the comments between the source and shared documents. This can be done, for instance, by periodically polling and obtaining reviewer comments created by the reviewers using the collaboration tool. The comments obtained from this polling process can then be integrated with the source document on the source authoring tool 210. RC Service 250 is also configured for receiving comments from the author (and created by the author using source authoring tool 210) for integration with the shared document on the collaboration tool.

Collaboration tool 260 is a collaboration tool (e.g., Adobe Acrobat or other PDF editing tool) for accessing a platform-independent rendition (e.g., a PDF file) of the source document (e.g., INDD file) on which a reviewer can edit and otherwise supply comments. Review commenting tool 270 is a common repository for collaboration or so-called shared documents (e.g., PDF documents) from collaboration tool 260 and through which the reviewers store their comments using a review commenting service that is part of or otherwise accessible to the collaboration tool. The review commenting tool 270 may be, for example, the Adobe Document Cloud and commenting service. Common Extensibility Platform (CEP) 280 can be used to extend functionality of tools provided in the source development platform 220, such as source authoring tool 210. So, for instance, in one example embodiment, CEP 280 is an Adobe-supported platform for interacting with and extending, such as with a Flash or HTML5 extension, any source tool provided in the Adobe Creative Cloud, such as Adobe InDesign, Adobe Illustrator, or Adobe Photoshop.

In further detail, and continuing to refer to FIG. 2, an author creates or opens the source document (e.g., an INDD document) using the source authoring tool 210 (e.g., Adobe InDesign). RC Extension 240 opens an RC Extension panel (e.g., a review comments panel, such as the RC Panel shown in FIGS. 7a-7b) or overlaying window (e.g., automatically or by the author) in the source authoring tool 210. In the panel/window, a given review comment (e.g., an existing review comment) is displayed or a new review comment session may be started. RC Extension 240 is an extension to source tools like source authoring tool 210 to accept and display comments from the author when using the source tool, and to facilitate the synchronization and display of comments on the source tool of the review of the source document (e.g., an INDD document) being done through a shared document (e.g., a PDF document). Comments to the source document, as obtained by the RC Extension 240 and displayed by RC Panel, can be stored, for example, in the source development platform 220, such as metadata for the source document.

The collaboration document is for receiving and displaying comments from reviewers of the source document. RC Extension 240 periodically fetches, via RC Service 250, the review comments associated with this review of the source document from the shared document. The review comments are maintained in the review commenting tool 270 through the review commenting service in this example embodiment. RC Service 250 serves as an interface between RC Extension 240 and the review commenting service of the review commenting tool 270. In some embodiments, RC Service 250 is further configured for converting or otherwise translating comments intended for display in one document format to comments intended for display in another document format (shared and source documents, respectively). As such, in one or more embodiments, RC Service 250 appears to the review commenting tool 270 as another reviewer of the shared document PDF using the collaboration tool 260, and appears to RC Extension 240 as another reviewer of the source document using the source authoring tool 210. For example, if RC Service 250 finds any new or updated comments to the shared document (e.g., a PDF document), then it converts or otherwise translates those comments as needed and forwards these updates to RC Extension 240 for updating the panel in the source document (e.g., a INDD document) accordingly. Note that, in some embodiments, no conversion or translation is needed, such as the case where the comment is only a naked textual comment (rather than a substantive edit to the document content). This is because a textual comment can be readily provided for display in the RC panel (e.g., ASCII text is universal, although any suitable text encoding scheme can be used). On the other hand, if font of the text is to be copied, then some translation may be needed, for instance, if the font is not supported in the source document or is otherwise not a universally supported font. Likewise, if the author adds or updates any comments to the source document through the RC panel in RC Extension 240, the RC Service 250 converts (as needed) and forwards these updates to the review commenting service for incorporation in the shared document. Further, since different tools may use different coordinate systems for maintaining locations of objects (such as comments) in documents, in some embodiments, those locations may have to be converted between formats, and the RC Service 250 can convert these locations between the two document formats so that the corresponding objects appear in their corresponding locations in both the source and shared documents.

Prior to receiving any comments from RC Service 250 for a particular review, the author exports the source document (e.g., an INDD document) to a corresponding shared document (e.g., a PDF document). As part of the exporting, the source document is linked to the shared document (e.g., a logical link to the shared document can be maintained as part of the source document's metadata, as generally shown in FIG. 2 by the "Link" box within the source document). There can be several such logical links for a particular source document, each to a different shared document and each representing a different review of the (same) source document. In one embodiment, the exported shared document is maintained in the source development platform 220 (e.g., in storage accessible through Adobe Creative Cloud). In one or more embodiments, the shared storage 230 (e.g., Adobe Shared Cloud) can track the location of user files stored in the source development platform 220 and the review commenting tool 270 (e.g., Adobe Document Cloud), and can serve as an interface for locating user files in either storage facility. In some embodiments, the shared storage 230 provides the features common to both the source development platform 220 and the review commenting tool 270. The shared document is shared with the other developers or reviewers, so that they can make comments in the shared document using the collaboration tool 260.

For example, each reviewer can open the shared document (e.g., PDF document) and review the content, which may include activity such as adding, updating, or deleting review comments in the PDF document using the review commenting service of collaboration tool 260 (e.g., Adobe Acrobat). These comments are stored with the shared document in the review commenting tool 270 (e.g., Adobe Document Cloud) using the review commenting service. The stored comments can be accessed, for example, through an application programming interface (API) that is part of the review commenting service accessible to the collaboration tool 260. Likewise, the author of the source document (e.g., INDD document) can open the source document in the source tool 210 and add, update, or delete comments in the source document using the RC Extension 240.

RC Service 250 synchronizes comments between reviews of the source document and its corresponding shared (e.g., PDF) documents by polling (e.g., continuously, at regular intervals, periodically, or some other appropriate cycle) all linked shared documents of the source document while the source document is open in the source authoring tool 210. For example, in one embodiment, RC Service 250 maintains a list of linked documents (shared documents linked to the same source document). In another embodiment, the linked documents are identified in the metadata of the source document (as indicated in FIG. 2 by the "Link" box in the source document). The RC Service 250 uses the available link information and polls the review commenting service for each of the shared documents while the corresponding source document is open in the source authoring tool 210. When a new comment or modification to a linked document is detected, RC Service 250 fetches the modification from the review commenting tool 270 through the review commenting service, and converts and sends the modification to RC Extension 240 through the CEP 280 interface, e.g., through an inter-process communication (IPC). RC Extension 240 then processes the comment and updates the RC panel in the source document accordingly.

As will be appreciated, reference to an "extension" or "Ext" or "background process" herein generally refers to an executable software component that is programmed or otherwise configured to add and carry out certain functionality to an existing application. Such extensions or background processes can be, for instance, a plugin or so-called add-in module, although any number of executable modules can be used. Such modules can be coded using any number of suitable instruction sets (e.g., C, JavaScript, C++, objective C, basic, to name a few examples), and may also be implemented in hardware, such as gate-level logic or an application specific integrated circuit (ASIC) or field programmable gate array (FPGA). To this end, the extensions and background processes can be used to modify or otherwise upgrade existing applications to carry out the functionality provided herein, including the establishment of a logical link between source and shared documents to be used for the purpose of synchronizing comments between those documents.

Figure 3:
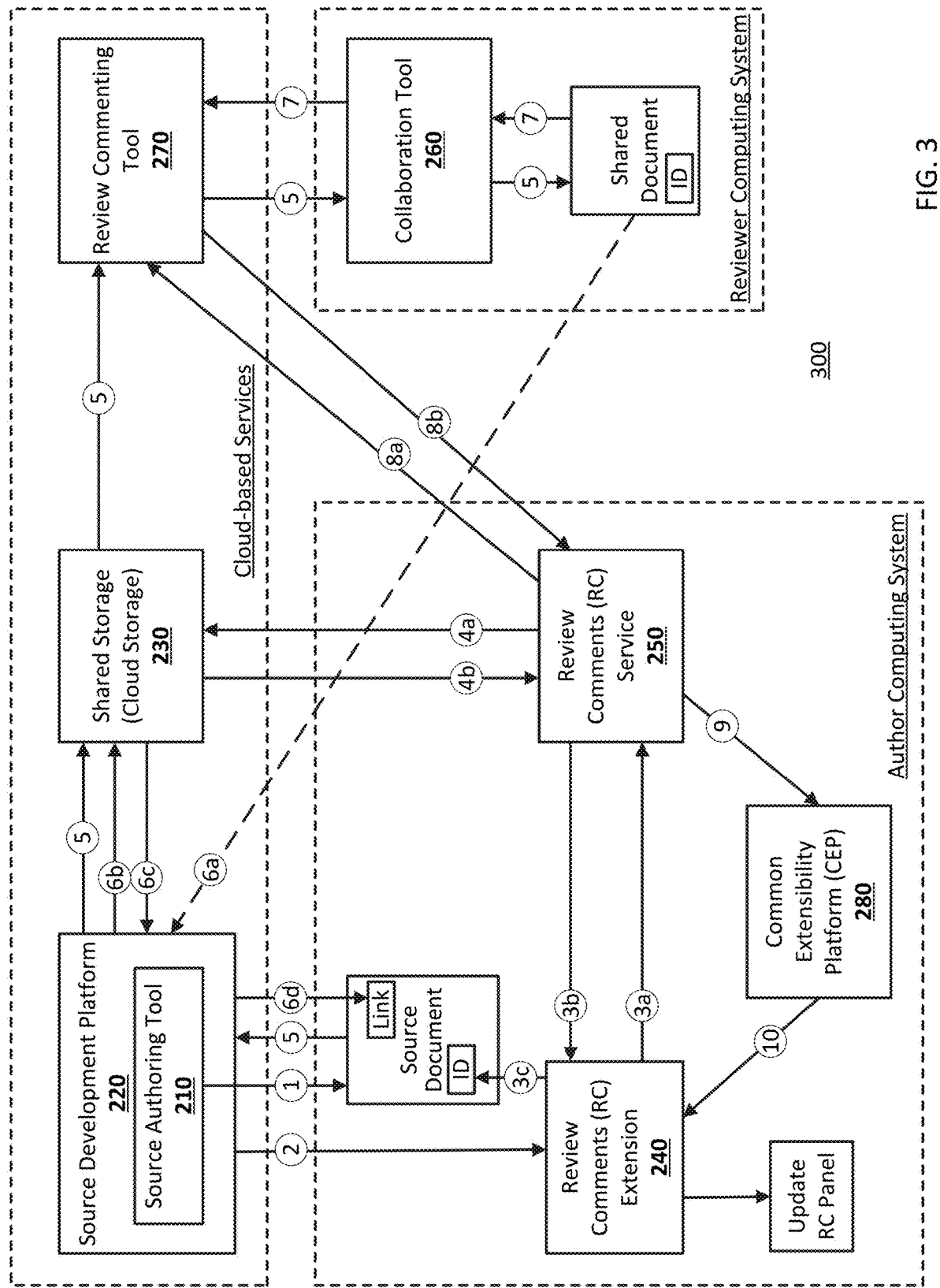
FIG. 3 is an example annotated data flow diagram of the system shown in FIG. 2, according to an embodiment of the present disclosure.

FIG. 3 is an example annotated data flow diagram of a system 300 for synchronizing review comments between a source document and a shared document created from the source document, according to an embodiment of the present disclosure. For ease of description, the same components illustrated in the system 200 of FIG. 2 are illustrated in FIG. 3, and their corresponding descriptions are equally applicable here. Data flow (circled) numbers and corresponding (proximal) arrowheads are used to indicate the flow of data between components. Note that the use of numbers does not connote a particular order between the different data flows. Moreover, reference to specific types of source documents (e.g., INDD) and shared documents (e.g., PDF) and the various platforms and programs that generate such documents is not intended to limit the present disclosure to specific platforms and applications, as will be appreciated.

In data flow 1, a new or existing source document (e.g., INDD document) native to the source authoring tool 210 (e.g., Adobe InDesign) is created or opened and then saved in the source development platform 220 (e.g., Adobe Creative Cloud). For a new source document (or new version of an existing source document), a corresponding unique asset ID (e.g., "INDD2") is created by the shared storage 230 (e.g., Adobe Shared Cloud storage manager) for the saved source document. Other such saved source documents have different asset ID's, as do different versions of the same source document.

In data flow 2, RC Extension 240 is automatically loaded with the opening of the source document, such as an INDD document. If there is more than one review of the source document, a selection of the different reviews can be presented to the author. For an existing review of the source document, RC Extension 240 fetches and displays any comments for that review from RC Service 250, e.g., comments made to the corresponding shared document since the review of the source document was last opened (or since RC Extension 240 was last run). In one embodiment, RC Extension 240 is further responsible for providing and updating a reviewer comment (RC) panel on the displayed source tool. Note that this RC panel may be similar to a review commenting panel in the collaboration tool. In another embodiment, RC Extension 240 may be programmed or otherwise configured to provide a separate window (e.g., partially overlaying the displayed source tool or source document). Example source and collaboration tool user interfaces including an RC panel will be discussed in turn with reference to FIGS. 6, 7a and 7b.

Now, if the author wants to start a new review for the source document (e.g., INDD), a linking of the source document to a corresponding shared document (e.g., PDF) is set up. So, in data flow 3a, RC Extension 240 supplies RC Service 250 with sufficient information to obtain the asset ID of the source document. For instance, the RC Extension 240 can supply the RC Service 250 with the authorized user's access token, e.g., "token2", and file path to the source document in the storage facility of source development platform (e.g., Adobe Creative Cloud) 220, e.g., "path2". In turn, and as shown in data flow 4a, RC Service 250 makes a call to the shared storage 230 (e.g., Adobe Shared Cloud) which manages the asset ID's. The call can be, for instance, a journal API call that supplies the appropriate parameters (for example, "token2" and "path2"). In response, the shared storage 230 returns the asset ID (for example, "INDD2"), as shown in data flow 4b. In data flow 3b, the returned asset ID is provided to the RC Extension 240, and can further be provided to the source document as shown in data flow 3c or elsewhere in the system, as will be appreciated. Once this asset ID of the source document is known, it can be used to link the source document to one or more shared documents, as will be explained in turn.

Continuing with the new review, in data flow 5, the source document (e.g., an INDD document) for this review is exported to the shared document (e.g., a PDF document) using the source development platform 220. The shared document can then be accessed by the collaboration tool 260. Note that if the author has added comments to the source document via RC Extension 240, then those comments are also exported to the shared document, as described in further detail below. At this point of the example process flow, there is a source document and a corresponding shared document for the new review cycle. The exporting can be carried out in a number of ways.

For two-dimensional graphical content, RC Service 250 can maintain a mapping of the coordinate system used in the source document to the coordinate system used in the shared document (and vice versa), as well as a mapping of the objects and textual elements in the source document to corresponding ones in the shared document (and vice versa). For example, each object or element in the source document can be assigned a unique ID (UID) together with an identifying set of coordinates in the source document. After the exporting, corresponding objects or elements in the shared document can carry the same UID and a corresponding (mapped) set of coordinates in the shared document. As such, locations (such as objects, text, or coordinate positions) between the source document and the shared document can be synchronized to aid in the synchronizing of the comments (e.g., the location of a comment in one document can be mapped to the corresponding location in the other document when synchronizing the comment to the other document). For example, the mappings between the different coordinate systems can be maintained in translation matrices built during the export of the source document to the shared document. The mapping data structures can be maintained in the source development platform 220 and associated with the shared document so that any mapping can be performed, for example, by RC Service 250 when synchronizing comments between RC Extension 240 and the review commenting service in the collaboration tool 260. For instance, comments entered in the source document can be translated by RC Service 250 to their corresponding locations in the shared document prior to forwarding them to the review commenting service of tool 270. Likewise, comments made to the shared document can be translated by RC Service 250 to their corresponding locations in the source document prior to sending any updates to RC Extension 240.

In data flow 6a, the shared document is saved in the source development platform 220, either directly or via the review commenting tool 270 and/or shared storage 230. In any case, a corresponding asset ID (e.g., "PDF2") is created by the shared storage 230. This asset ID can be obtained, for example, by a journal API call/response sequence similar to that used to obtain the asset ID of the source document (RC Service 250, at 4a and 4b). Alternatively, as shown in example data flows 6b and 6c, the API call and response can be carried out by the platform 220 or tool 210. In either case, the asset ID's of the source document and the shared document are now known and are used to generate a logical link (e.g., "INDD2:PDF2"), as shown in data flow 6d. In any such cases, RC Service 250 can use that link to query tool 270 for comments relevant to the shared document(s) related to a given source document. Further, if there are, for example, two other shared documents (having different asset ID's, e.g., "PDF3" and "PDF4"), the asset ID of the source document is linked with all three shared documents (such as "INDD2:PDF2,PDF3,PDF4"). In one embodiment, the linking information is stored in the source development platform 220 along with the source document, or in the metadata of the source document (e.g., as part of the database schema). The shared document is stored in the review commenting tool 270, but other storage locations can be used as well, as will be appreciated.

In data flow 7, the author has indicated a review is desired, and the reviewers are notified of the shared document, which gets copied to the review commenting tool 270 (together with any comments entered by the author, e.g., through RC Extension 240 via RC Service 250, before starting the review). As previously explained, the review commenting tool 270 further includes a review commenting service accessible to the collaboration tool 260, which stores and maintains comments made by the different reviewers. The reviewers start (or, for an existing review, continue) adding/updating/deleting comments in the review commenting service API of each of the reviewers' collaboration tool 260 (e.g., in the collaboration tool's viewer on each reviewer's computing system). The review commenting service available to the collaboration tool has a separate platform-dependent API for each of the reviewers, which collects the various comments from each reviewer while the review commenting service updates and stores the collected comments for the shared document (e.g., through the shared document's asset ID), as shown in data flow 7. By way of example, the shared document can be copied to the repository of the review commenting tool 270 so that a web view of the collaboration tool (e.g., web-based Adobe Acrobat) can be used by each of the reviewers to add comments. In another embodiment, local collaboration tools (e.g., native Adobe Acrobat) can be used, which in turn collect comments and forward those comments to the review commenting service maintaining the shared document in the review commenting tool 270.

In data flow 8a, RC Service 250 periodically polls (e.g., at a predetermined interval or other suitable polling scheme), using the asset ID for the shared document that was linked to the source document for this review) for new or updated comments from the review comments stored in the review commenting tool 270 by the review commenting service. If RC Service 250 finds any updates to the comments, it retrieves the changes at data flow 8b and converts (if needed) and makes them available for display using the source tool 210, as shown in data flows 9 and 10.

In data flow 9, RC Service 250 forwards any received comments to CEP 280 (for example, using an IPC call), which handles messages to CEP extensions such as RC Extension 240. In data flow 10, CEP 280 checks that the forwarded comments are intended for RC Extension 240 (for example, RC Extension 240 may be the only CEP extension registered for this event) and hands them over to RC Extension 240. At this point, and with further reference to previously described data flow 2, the RC Panel (as manifested by RC Extension 240) in source authoring tool 210 is updated to reflect the newly delivered comments.

Figure 4:
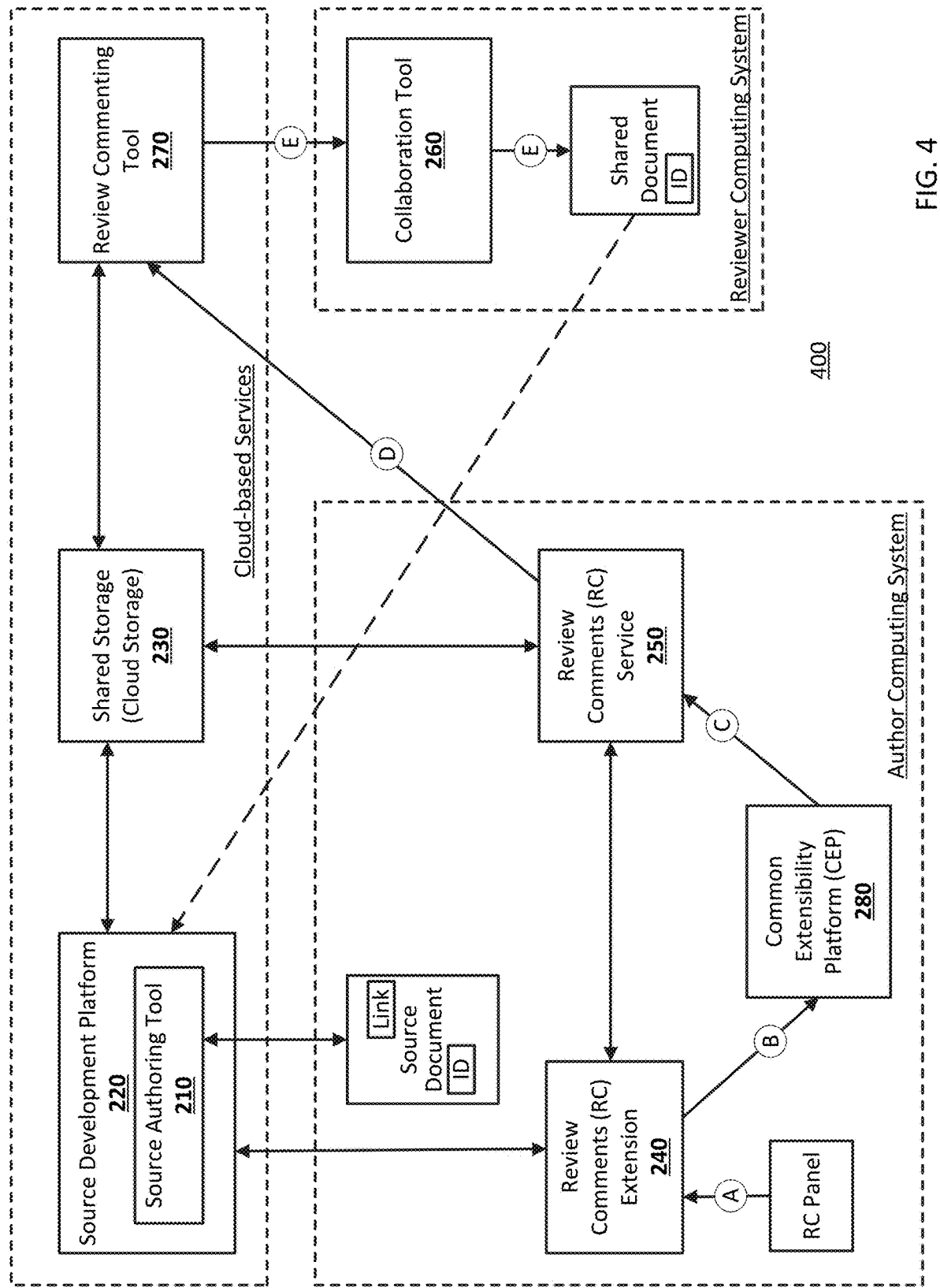
FIG. 4 is an example annotated data flow diagram of the system shown in FIG. 2, according to another embodiment of the present disclosure.

FIG. 4 is an example annotated data flow diagram 400 of a system for synchronizing review comments between a source document and a shared document created from the source document, according to another embodiment of the present disclosure. For ease of description, the same components illustrated in the systems 200 and 300 of FIGS. 2 and 3 are illustrated in FIG. 4, and their corresponding descriptions will not be repeated, while data flow is illustrated (e.g., labeled) in FIG. 4 in a manner similar to that of FIG. 3. FIG. 3 is directed to illustrating the initiating of a review of the source document through the shared document as well as synchronizing comments from the shared document, as displayed with the collaboration tool (e.g., Adobe Acrobat) 260, to the source document, as displayed with the source authoring tool (e.g., Adobe InDesign) 210. FIG. 4, on the other hand, is directed to the other comment flow direction, namely illustrating the synchronization of comments from the source document to the shared document.

Referring to FIG. 4, in data flow A, comments made to the source document are entered through the RC Panel as part of the RC Extension 240. The RC Panel shows a concurrent (e.g., synchronized) display of review comments in a manner similar to that of the GUI (graphical user interface) of each of the different review commenting interfaces of the collaboration tool 260 (e.g., Adobe Acrobat). For example, comments in the RC Panel are associated with locations in the source document while their corresponding synchronized comments in the shared document have the same statements and other attributes, and their locations are the corresponding locations in the shared document (as determined, for example, by the mappings, such as translation matrices, between the coordinate/object/textual elements of the two documents). As described earlier, for example, each comment or update to a comment in the source document can include a UID for a corresponding object or element in the source document as well as a set of coordinates to describe the comment's location in the source document.

In data flow B, the newly updated comments from the RC Panel are transmitted as a message from RC Extension 240 to CEP 280, such as by using an IPC call. In data flow C, CEP 280 determines the received comments message is intended for RC Service 250, and forwards the message onto RC Service 250. In data flow D, RC Service 250 converts (as needed) the received comments to a format compatible with the shared document (e.g., using a corresponding translation matrix or other data structure) and forwards the converted comments to the review commenting service (using a review commenting service API). For example, RC Service 250 may send the source document comments (with their UIDs and sets of coordinates) and the asset ID of the source document linked to the shared document stored in the review commenting tool 270 via the API of the review commenting service.

Accordingly, in data flow E, the review commenting service updates the comments in the shared document to reflect the newly received comments from RC Service 250, so that reviewers of the shared document see the updated (e.g., synchronized) comments made to the source document by the author in their corresponding readers or viewers of the shared document using the collaboration tool 260. On a further note, during the export of the source document to the shared document, comments made to the source document via RC Extension 240 are converted or otherwise translated (as needed) by RC Service 250 to a format compatible with the shared document prior to embedding them in the shared document (e.g., using the review commenting service API). In another embodiment, the source document metadata and the shared document coordinates of any source comment are also embedded (e.g., through API's) inside the shared document (for example, during the export of the source document to the shared document).

Figure 5:
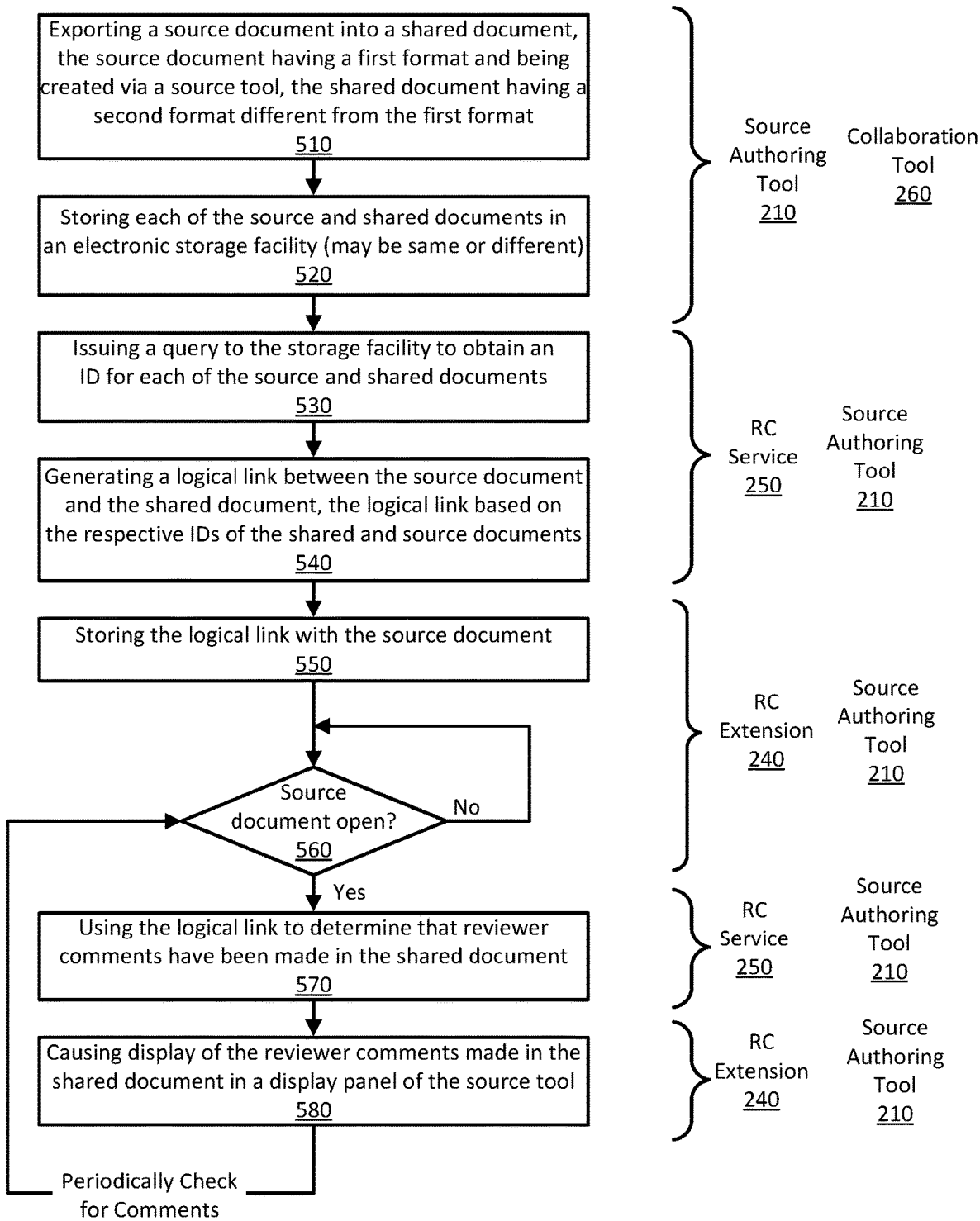
FIG. 5 is a flow diagram of an example method of synchronizing review comments between a source document and a shared document created from the source document, according to an embodiment of the present disclosure.

FIG. 5 is a flow diagram of an example method 500 of synchronizing review comments between a source document and a shared document created from the source document, according to an embodiment of the present disclosure. Example components of the system 200 of FIG. 2 that can carry out these functions are referred to in FIG. 5, although the methodology is not intended to be limited to the architecture shown in FIG. 2, as will be appreciated in light of this disclosure. Further note that not all features shown in FIG. 2 are needed to execute the method 500. Method 500 and other methods disclosed herein may be implemented, for example, on an electronic computing circuit, such as a processor or processor-based system, microprocessor, field programmable gate array (FPGA), or other custom electronic circuit, programmed or otherwise configured to carry out the disclosed method. For example, the processor may have a memory for accessing computer instructions or data retrieved from a nonvolatile storage medium, and an arithmetic logic unit for executing the instructions on the data to perform the disclosed method.

The method includes exporting 510 a source document into a shared document. The source document has a first format and is created via a source tool. The shared document has a second format different from the first format. As used generally herein, "format" refers to the internal organization or file format of an electronic document, such as the organization or file format of the document as created or edited by the tool (and perhaps the version of the tool) that maintains the document and the document's internal organization. The format may be proprietary or open. There may be multiple tools that work on files having the same format, or multiple file formats supported by the same tool. In general, if a first tool stores a first document using a first internal organization of the data, and a second tool stores the equivalent second document ("equivalent" in a sense that both the first and second documents display similarly through their respective tools) using a second internal organization, and the first and second internal organizations are different, then the first and second formats are different.

For example, "format" can refer to the filename extension used to refer to the electronic document, with two documents having the same format if they have the same filename extension. So, for instance, the source document can be an INDD document (e.g., filename extension ".indd") and the shared document can be a PDF document (e.g., filename extension ".pdf"). These are different formats in a sense that different tools (e.g., InDesign and Acrobat) are used to open and maintain the documents, even if the displayed content of the documents in the different tools is quite similar (such as when the shared document is exported from the source document). Other first and second document formats can be used as well. For example, other source document formats can be Adobe Illustrator (e.g., filename extension ".ai"), Adobe Photoshop (e.g., filename extension ".psd", ".psb", or ".pdd"), Adobe PageMaker (e.g., filename extension ".pmd"), and Adobe FrameMaker (e.g., filename extension ".fm"), to name a few.

The method continues with storing 520 each of the source and shared documents in an electronic storage facility (may be same or different). For instance, in one specific example embodiment, the INDD source document is saved in the storage facility of the Adobe Creative Cloud service (platform 220), and the shared document can be saved in the storage facility of the Adobe Document Cloud and commenting service (tool 270). Alternatively, both documents can be stored in either one of these storage facilities. As can be further seen in this example methodology, the exporting 510 and storing 520 can be carried out, for instance, by the source authoring tool 210 (or some other platform 220 asset), or possibly the collaboration tool 260.

The method continues with issuing 530 a query to the appropriate storage facility to obtain an ID for each of the source and shared documents, and generating 540 a logical link between the source document and the shared document. The logical link is based on the respective IDs of the shared and source document. In one example case, the query is issued to a storage facilities manager, such as the Adobe Shared Cloud service (shared storage 230), which can be used to manage storage of both the Adobe Creative Cloud service and the Adobe Document Cloud and commenting service, according to some embodiments. As can be further seen in this example methodology, the issuing 530 and generating 540 can be carried out, for instance, by the RC Service 250, or possibly the source authoring tool 210 (or some other platform 220 asset).

The method continues with storing 550 or otherwise associating the logical link with the source document. Thus, once the source document is opened in the source authoring tool 210, the asset ID of all the shared documents is known and readily available. As will be appreciated in light of this disclosure, knowing the asset IDs of the shared documents allows for polling for and retrieval of new and updated comments provided in those shared documents, when the source document is open on the source authoring tool 210. To this end, the method further includes determining 560 whether or not the source document is open on the source authoring tool 210. If not, the method simply waits for the source document to be opened. This detection may be made, for instance, when RC Extension 240 launches. As can be further seen in this example embodiment, the storing 550 and determining 560 can be carried out, for instance, by the RC Extension 240, or possibly the source authoring tool 210 (or some other platform 220 asset), or some other asset local to the author's computing system (or reviewer's computing system, as the case may be).

On the other hand, if the determination at 560 indicates that the source document is open, the method continues with using 570 the logical link to determine that reviewer comments have been made in the shared document, and causing 580 display of the reviewer comments made in the shared document in a display panel of the source tool. So, in one example case, RC Service 250 issues a query to the review commenting tool 270. The query includes the asset ID of the shared document(s) in question. Thus, the review comment tool 270 can check its storage facility for any new or changed comments associated with the provided asset ID(s). If any such new or changed comments are found, they are returned back to the RC Service 250. The returned comments are then provided to the RC Extension 240 for display in the RC panel. In other embodiments, using 570 and causing 580 can be carried out by the source authoring tool 210 (or some other platform 220 asset), or some other asset local to the relevant computing system. As can be further seen, the methodology periodically repeats using 570 and causing 580 as long as the source document remains open.

Figure 6:
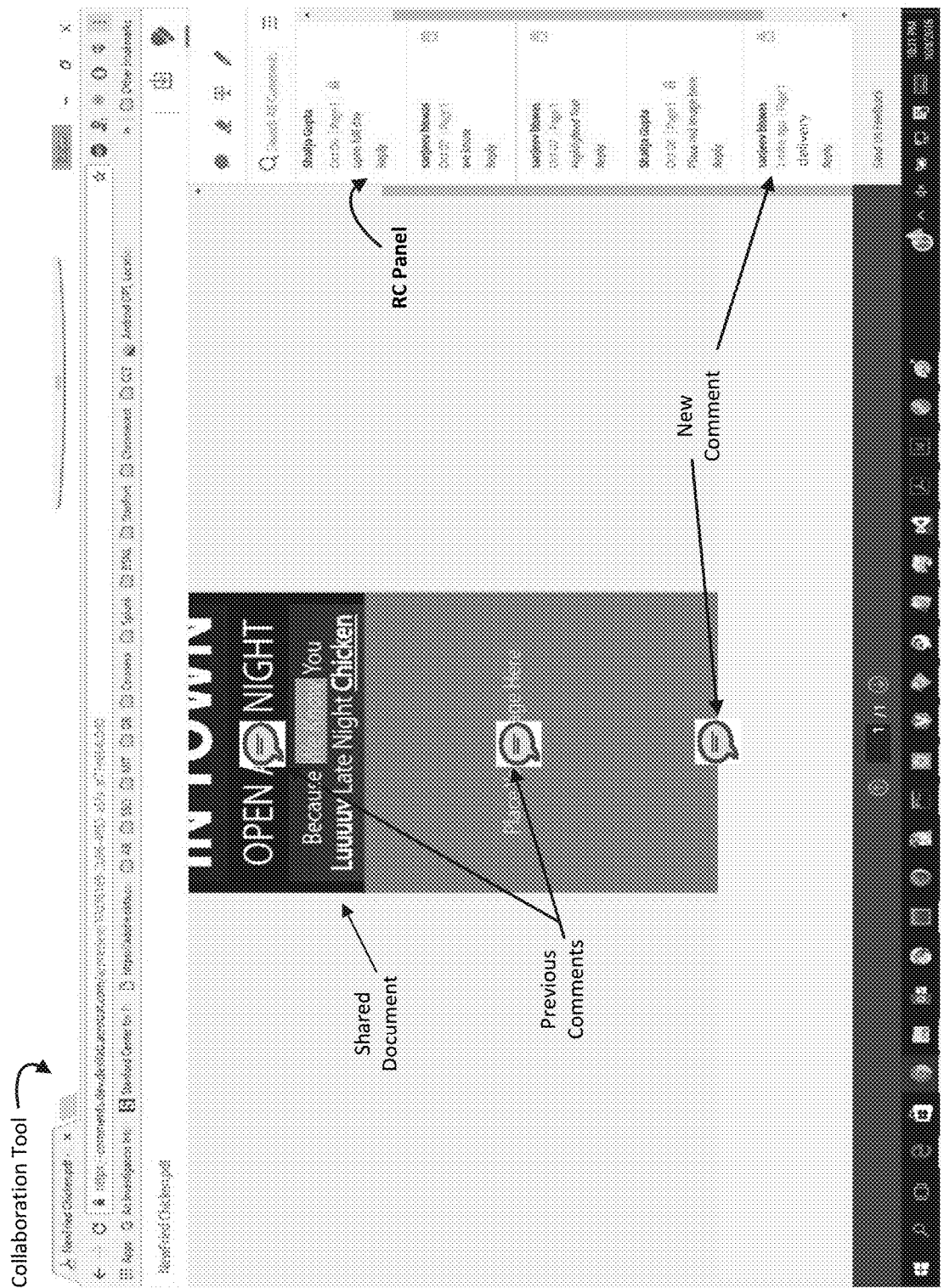
FIG. 6 shows an example screen shot of a user interface of a collaboration tool, according to an embodiment of the present disclosure.
Figure 7A:
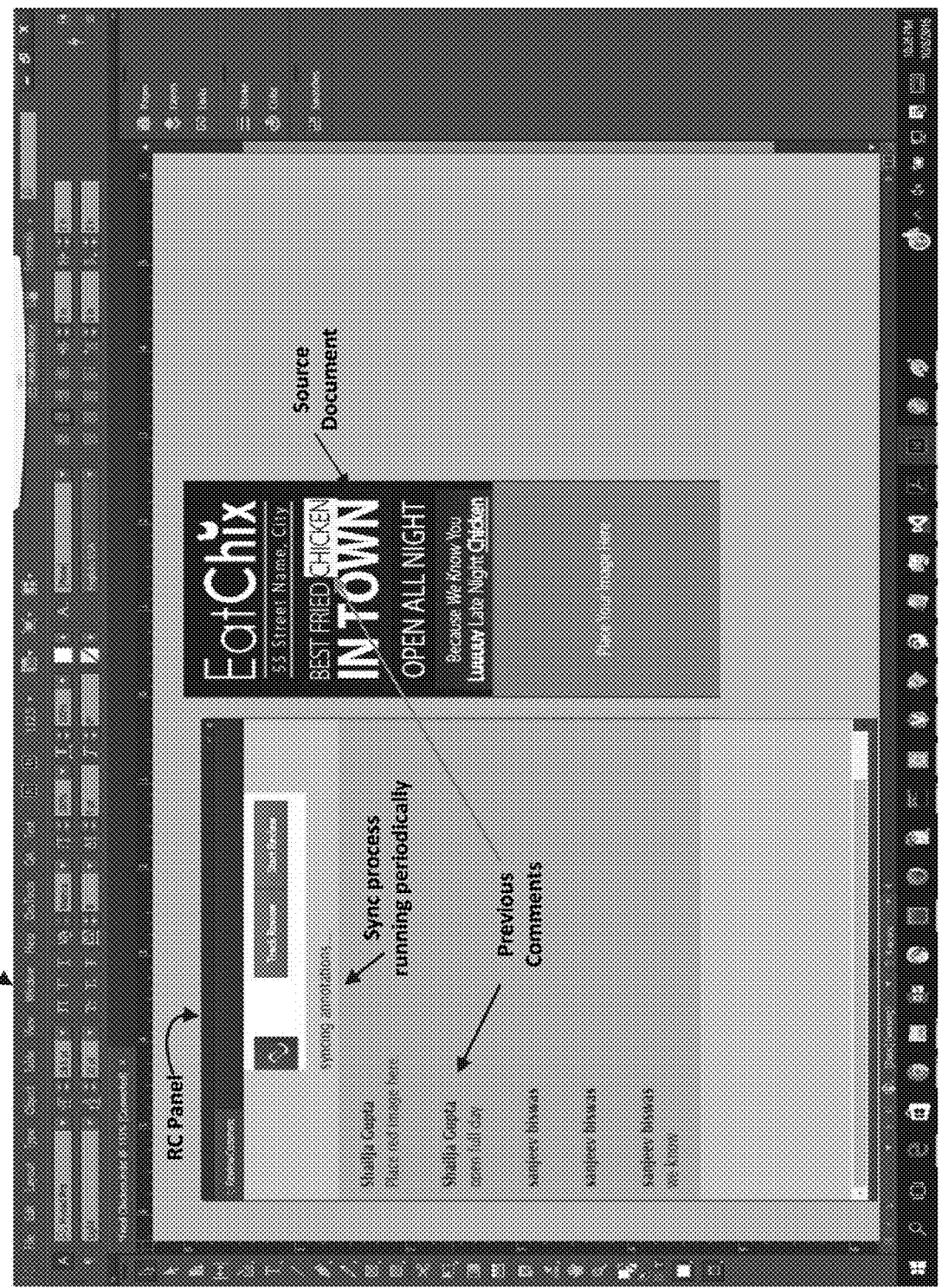
FIGS. 7a and 7b each shows an example screen shot of a user interface of a source authoring tool, according to an embodiment of the present disclosure
Figure 7B:
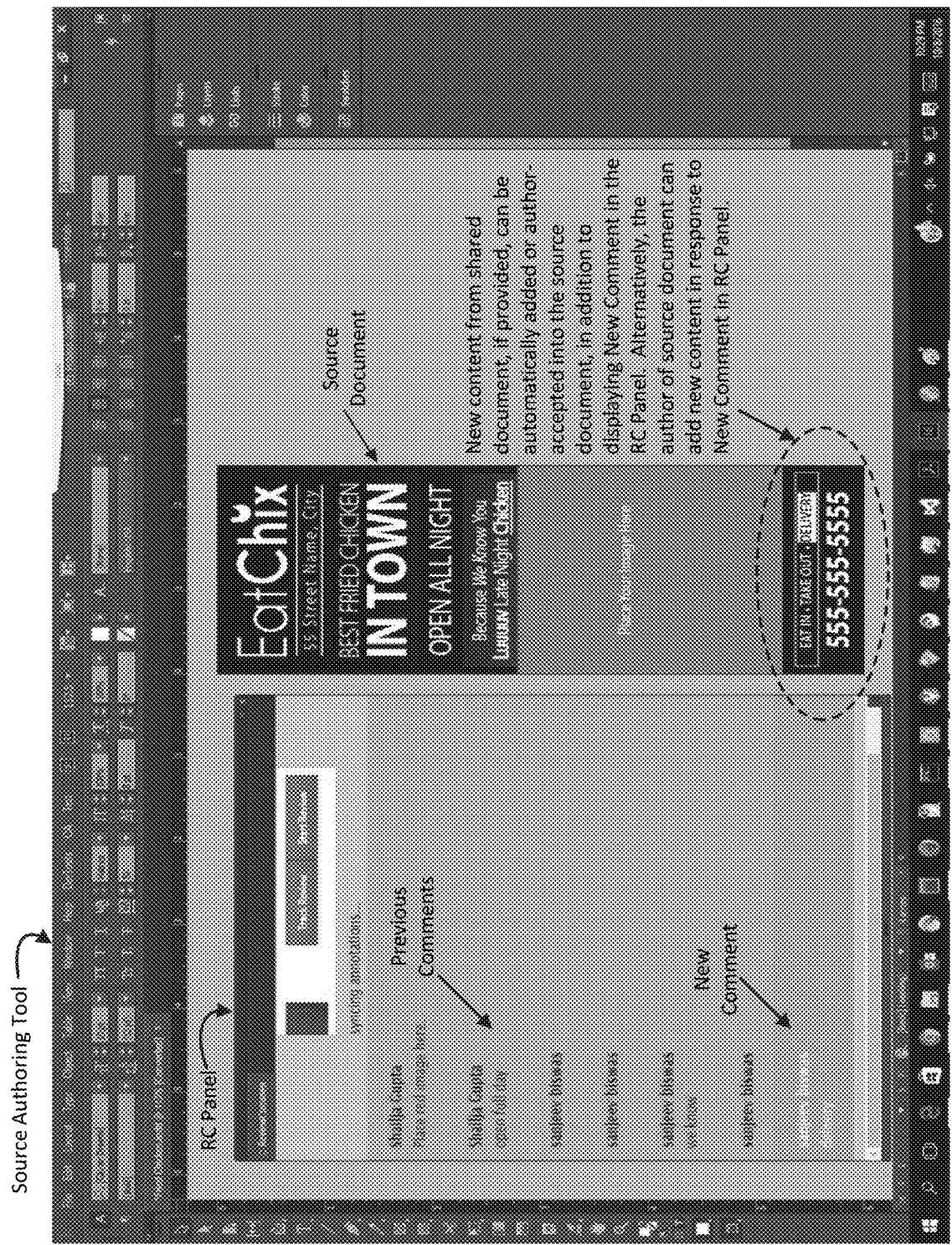

FIG. 6 shows an example screen shot of a user interface of a collaboration tool, according to an embodiment of the present disclosure. As can be seen, a shared document has been exported from a source document, and is displayed in a collaboration tool. In addition, a number of reviewer comments have been provided. An RC panel is provided on the right side in this example case, and the various reviewer comments are visible therein. FIG. 7a shows an example screen shot of a user interface of a source authoring tool, according to an embodiment of the present disclosure. As can be seen, the source document from which the shared document shown in FIG. 6 was exported is open and displayed in a source authoring tool. An RC panel is provided to the left of the source document in this example case. Note that newest comment shown in FIG. 6 is not yet present in the RC panel of the source authoring tool shown in FIG. 7a. However, a synchronization process is running periodically, and currently active. FIG. 7b shows an example screen shot of the user interface of the source authoring tool, after the synchronization has completed. Note the new comment regarding delivery is now present in the RC panel. Further note that the content of the source document itself has been refined to include a reference to delivery being available and a telephone number. In some embodiments, the associated edits to the content of the source document (e.g., regarding availability of delivery, take-out, and telephone number, as well as the color scheme and overall design of the added content) can be made by the author in response to the new comment shown in the RC panel. In other embodiments, however, the associated edits to the content of the source document can be made automatically by exporting those changes from the shared document and integrating them into the source document using a corresponding translation matrix or other mapping data structure as previously explained. Numerous such automatic reviewer comment update schemes will be appreciated in light of this disclosure. The comment update may be from a source authoring tool to a collaboration tool, or from a collaboration tool to a source authoring tool. Updates can be made in a similar fashion to update the shared document from the source document, as shown in FIG. 4.

Example Working Embodiment

An example process flow according to one specific embodiment will now be provided. For purpose of this example embodiment, the source document is an INDD document created by the Adobe InDesign authoring tool, and the shared document is a PDF document created by Adobe Acrobat. Table 1 further details this example implementation, with reference to the functional blocks of the example embodiment depicted in FIG. 2.

TABLE 1

Example Implementation of the Embodiment shown in FIG. 2

| Block | Example Implementation |
|---|---|
| Source Authoring Tool 210 | Adobe InDesign application |
| Source Development Platform 220 | Adobe Creative Cloud suite of applications |
| Shared Cloud Storage 230 | Adobe Shared Cloud storage facilities manager |
| RC Extension 240 | RC Extension that runs with Adobe InDesign |
| RC Service 250 | Background process that runs with Adobe InDesign |
| Collaboration Tool 260 | Adobe Acrobat collaboration tool |
| Review Commenting Tool 270 | Adobe Document Cloud storage and commenting service |
| CEP 280 | CEP extension that runs with Adobe InDesign |
| Source Document | INDD document |
| Shared Document | PF Document |

Before providing details, it may be helpful to provide a high-level summary of the example process flow. The detailed example process flow will immediately follow the summary.

The process flow begins with the author creating or opening an INDD source document. In response to this action, an RC extension panel loads up in the Adobe InDesign authoring tool. The RC extension presents an RC panel (such as the RC panel shown in FIGS. 7a-b) and fetches any reviewer comments associated with this INDD document from the commenting service via the RC Service. If the fetch finds any reviewer comments, those comments are loaded in and presented via the RC panel. Now the author wants to export the native INDD document to share it with his/her reviewers in the form of a PDF document. Once exported, the PDF document is linked with the INDD source document and stored in cloud storage (e.g., Adobe Document Cloud or Creative Cloud storage facilities). The logical link is based on the asset IDs of the INDD and PDF documents is associated with the INDD document and possibly the PDF document (to allow for two-way synchronization, from INDD to PDF, and vice-versa). Now the PDF document is shared with the reviewers. A reviewer opens the PDF document via the collaboration tool and starts reviewing the content. She can add, update, or delete a comment in the PDF document. These annotations are stored against the PDF document via APIs of the commenting service through the Adobe Document Cloud PDF reader app (Adobe Acrobat). The RC Service periodically polls on all the documents linked to the INDD source document which is still opened in the Adobe InDesign authoring tool. This polling is carried out by a call to the commenting service using the asset ID of the linked PDF document(s). The moment a new comment is added (or there about), the RC Service will fetch it and send an IPC call (e.g., Vulcan event) to the CEP extension that runs with the Adobe InDesign authoring tool and which flows into the RC Extension. The RC Extension will then process the comment and update the RC panel. The source document content itself may also be updated with any content edits returned by the fetch process.

Now the example process flow will be described with further detail, with reference to the following events.

1) The new INDD source document is created in the Adobe InDesign authoring tool and saved in the cloud storage facility, which in this example embodiment is part of the Adobe Creative Cloud suite of software products. This suite includes a collection of software developed by Adobe Inc. for graphic design, photography editing, video editing, web development, and cloud services.

2) An asset ID is created by the Adobe Shared Cloud storage manager for the saved document. Note in this example embodiment that the Adobe Creative Cloud platform has a connector to the Adobe Shared Cloud storage manager. The asset ID is acquired as follows. When the Adobe InDesign authoring tool is launched, the RC Extension is loaded on the author's computing system. The RC Extension calls into the RC Service with the authorized user's access token, which is referred to as _token_ in this example. The RC Service then queries the Adobe Shared Cloud storage manager using the journal APIs using the access token to get the asset ID of the INDD source document. This query/response process can be carried out, for instance, as further explained in 2a through 2c.

a. An API GET call from the RC Service to the Adobe Shared Cloud storage manager is used, such as: /api/v1/journal/?pathFilter=/Untitled%20Folder/.
   b. The path is to the filepath of INDD source document which is saved in a mounted drive of the Adobe Creative Cloud storage facility, according to one specific case. The _token_ is also embedded in the HTTPS header.
   c. In return, the RC Service gets the asset ID. The asset ID is referred to as CC_Asset_ID_INDD, in this example embodiment.

3) Once ready for the review process, the author exports the INDD source document into a PDF document to be shared with reviewers. Note that if the author has added some of his/her notes to the INDD source document via the RC Extension then these comments are also exported to the PDF document, so the reviewers will be able to see those comments. The PDF document is saved in the Adobe Creative Cloud storage facility, and becomes available for review.

4) At this point, the logical link between the INDD and PDF document is created. Note that the PDF document can be stored either in the Adobe Creative Cloud storage facility or the Adobe Document Cloud storage facility, but the Adobe Shared Cloud storage facilities manager issues an asset ID for the PDF document, in this specific example embodiment. This PDF shared document asset ID is attached to or otherwise used in conjunction with the INDD source document asset ID (previously retrieved at 2 above) to provide a logical link between the INDD source document and the shared PDF document. This link is stored inside or otherwise associated with the INDD source document as metadata, or otherwise used in the database schema.

The following further explains an example embodiment for obtaining the PDF document asset ID and creating the logical link.

a. An API GET call from the RC Service to the Adobe Shared Cloud storage facilities manager is used to get the asset ID for the PDF document. This asset ID is referred to as CC_Exported_Asset_ID#1_INDD, in this example embodiment. Note the API GET call may be similar to the API GET call to obtain the source document asset ID, previously retrieved at 2(a) above.
   b. According to one example embodiment, the logical link generated from the two asset IDs is as follows: {master_key: CC_Asset_ID_INDD, links: [CC_Exported_Asset_ID#1_INDD]}. As will be appreciated, this is a JSON representation of the logical link. Numerous other suitable representations can be used.
   c. This logical link can reside inside, or otherwise be associated with, the INDD source document as part of its database schema (or so-called metadata) or can reside in the Adobe Creative Cloud storage facility along with the INDD source document.
   d. In some embodiments, the logical link can be encrypted or otherwise made tamperproof.

5) Once the PDF document is so linked to the INDD source document, the PDF can be shared with reviewers, and can be edited and receive comments from the reviewers. In one embodiment, if not already done, the PDF document is copied onto the Adobe Document Cloud storage facility along with any reviewer comments. The reviewer(s) start adding/updating reviewer comments in the PDF Acrobat collaboration tool, which may be a web-based or native (local stored) version. All the reviewer comments get uploaded to the commenting service of the Adobe Document Cloud storage facility via an API. These comments are stored in the Adobe Document Cloud storage against the asset ID of the PDF document (i.e., CC_Exported_Asset_ID#1_INDD, in this example case).

6) If the author wishes to see the comments provided, he/she can open the INDD source document in the Adobe InDesign authoring tool. At this point, the RC Service will continuously or otherwise periodically poll for reviewer comments stored against the asset ID of the PDF document which was previously linked to the INDD source file, in 4 above.

7) If the RC Service determines a new or updated (added, deleted, modified) reviewer comment is available, then the RC Service sends an IPC call (e.g., Vulcan event). The IPC message (packet) returned includes the reviewer comment details.

8) The CEP extension that runs with Adobe InDesign checks that the received message is meant for RC Extension, such that it was the only one which registered for this event, and hands it over to RC extension.

9) At this point, the RC Panel will update the display panel with the new data on the reviewer comment.

10) As will be appreciated, the methodology can be carried out in a similar, reverse fashion, with respect to synchronizing/flowing any commenting done in the native INDD source document into the exported PDF documents which are linked to that source document.

FURTHER EXAMPLE EMBODIMENTS

Example 1 is a method of synchronizing comments between a source document and a shared document, the shared document having been exported from the source document, the source document having been created via a source tool and having a first format, and the shared document having a second format different from the first format. The method includes generating a logical link between the source document and the shared document, the logical link based on an ID of the shared document and an ID of the source document, and associating the logical link with the source document. In response to the source document being open in the source tool, the method further includes using the logical link to determine that reviewer comments have been made in the shared document, and causing display of the reviewer comments made in the shared document in a display of the source tool.

Example 2 includes the subject matter of Example 1, wherein using the logical link to determine that reviewer comments have been made in the shared document includes periodically polling at least one of a database and a commenting service to receive new reviewer comments.

Example 3 includes the subject matter of Example 1 or 2, wherein causing display of the reviewer comments made in the shared document in a display of the source tool includes causing display of the reviewer comments in a reviewer comment panel displayed adjacent to but not covering content of the source document.

Example 4 includes the subject matter of any of the preceding Examples, wherein causing display of the reviewer comments made in the shared document in a display of the source tool includes updating display of content of the source document to include one or more content changes made by a reviewer.

Example 5 includes the subject matter of any of the preceding Examples, wherein associating the logical link with the source document includes storing the logical link with the source document.

Example 6 includes the subject matter of any of the preceding Examples, wherein the generating, associating, using, and causing are carried out by an executable module that is downloadable to a client computing system. Example executable modules include, for instance, plug-ins and extensions.

Example 7 includes the subject matter of any of the preceding Examples, wherein the source tool is a platform-dependent software application available via a cloud-based subscription service, and the reviewer comments are provisioned in the shared document via a collaboration tool that is a platform-independent software application.

Example 8 includes the subject matter of any of the preceding Examples, wherein the method further comprises: allowing, via the source tool when the source document is open therein, the ability to at least one of add a new comment, and reply to one or more of the reviewer comments displayed in the display of the source tool; and initiating propagation of at least one of an added new comment and a reply to one or more collaboration tools, so the at least one of the added new comment and the reply can be displayed at the one or more collaboration tools.

Example 9 is a computer program product including one or more non-transitory machine readable mediums encoded with instructions that when executed by one or more processors cause a process to be carried out for synchronizing comments between a source document and a shared document, the shared document having been exported from the source document, the source document having been created via a source tool and having a first format, and the shared document having a second format different from the first format. The process includes generating a logical link between the source document and the shared document, the logical link based on an ID of the shared document and an ID of the source document, and associating the logical link with the source document. In response to the source document being open in the source tool, the process further includes using the logical link to determine that reviewer comments have been made in the shared document, and causing display of the reviewer comments made in the shared document in a display of the source tool. The machine-readable mediums can be any non-transitory medium, such as a hard drive, solid state drive, random access memory (RAM), read only memory (ROM), compact disc, thumb drive, on-chip cache, or server memory, to name a few examples. Note that the machine-readable mediums and/or processors may be distributed and need not all reside in one location.

Example 10 includes the subject matter of Example 9, wherein using the logical link to determine that reviewer comments have been made in the shared document includes periodically polling at least one of a database and a commenting service to receive new comments.

Example 11 includes the subject matter of Example 9 or 10, wherein causing display of the reviewer comments made in the shared document in a display of the source tool includes causing display of the reviewer comments in a reviewer comment panel displayed adjacent to but not covering content of the source document.

Example 12 includes the subject matter of any of Examples 9 through 11, wherein causing display of the reviewer comments made in the shared document in a display of the source tool includes updating display of the source document to include one or more content changes made by a reviewer.

Example 13 includes the subject matter of any of Examples 9 through 12, wherein associating the logical link with the source document includes storing the logical link with the source document.

Example 14 includes the subject matter of any of Examples 9 through 13, wherein the generating, associating, using, and causing are carried out by an executable module that is downloadable to a client computing system. Example executable modules include, for instance, plug-ins and extensions.

Example 15 includes the subject matter of any of Examples 9 through 14, wherein the source tool is a platform-dependent software application available via a cloud-based subscription service, and the reviewer comments are provisioned in the shared document via a collaboration tool that is a platform-independent software application.

Example 16 includes the subject matter of any of Examples 9 through 15, wherein the process further comprises: allowing, via the source tool when the source document is open therein, the ability to at least one of add a new comment, and reply to one or more of the reviewer comments displayed in the display of the source tool; and initiating propagation of at least one of an added new comment and a reply to one or more collaboration tools, so the at least one of the added new comment and the reply can be displayed at the one or more collaboration tools.

Example 17 is a system for synchronizing comments between a source document and a shared document, the shared document having been exported from the source document, the source document having been created via a source tool and having a first format, and the shared document having a second format different from the first format. The system includes: one or more computer memories encoded with instructions; and one or more processors configured to execute the instructions, thereby causing a number of operations to bear carried out. The operations include: generate a logical link between the source document and the shared document, the logical link based on an ID of the shared document and an ID of the source document, and associate the logical link with the source document. In response to the source document being open in the source tool, the operation further include: use the logical link to determine that reviewer comments have been made in the shared document; and cause display of the reviewer comments made in the shared document in a display of the source tool.

Example 18 includes the subject matter of Example 17, wherein using the logical link to determine that reviewer comments have been made in the shared document includes periodically polling at least one of a database and a commenting service to receive new comments.

Example 19 includes the subject matter of Example 17 or 18, wherein causing display of the reviewer comments made in the shared document in a display of the source tool includes at least one of: causing display of the reviewer comments in a reviewer comment panel displayed adjacent to but not covering content of the source document; and updating display of content of the source document to include one or more content changes made by a reviewer.

Example 20 includes the subject matter of any of Examples 17 through 19, wherein the source tool is a platform-dependent software application available via a cloud-based subscription service, and the reviewer comments are provisioned in the shared document via a collaboration tool that is a platform-independent software application.

The foregoing description of example embodiments of the present disclosure has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto.

What is claimed is:

1. A method of synchronizing comments between a source document and a shared document, the method comprising:
    sending the source document from an author computing system to a shared storage resource administered by a cloud-based service;
    after the source document has been sent to the shared storage resource, sending, from the author computing system, to the shared storage resource, a first query for a source document asset ID, wherein the first query includes an access token associated with a user of the author computing system and a location of the source document in the shared storage resource;
    after the source document has been sent to the shared storage resource, sending, from the author computing system, to the shared storage resource, a second query for a shared document asset ID, wherein the second query includes the access token, such that the first and second queries include the same access token;
    receiving, at the author computing system, from the shared storage resource, the source document asset ID and the shared document asset ID, wherein the source document asset ID uniquely identifies the source document, wherein the shared document asset ID uniquely identifies the shared document, and wherein the source and shared document asset IDs are generated and assigned to their respective documents by the shared storage resource;
    generating, at the author computing system, a logical link between the source document and the shared document, the logical link including the shared document asset ID and the source document asset ID received from the shared storage resource;
    associating the logical link with the source document;
    opening the source document at the author computing system;
    reading the shared document asset ID from the logical link that is associated with the source document;
    sending a comment polling request from the author computing system to a review commenting tool administered by the cloud-based service, wherein the comment polling request includes the shared document asset ID read from the logical link;
    receiving, at the author computing system, from the review commenting tool, one or more reviewer comments made in the shared document; and
    causing display of the reviewer comments made in the shared document in a display of the author computing system.

2. The method of claim 1, further comprising sending a subsequent comment polling request from the author computing system to the review commenting tool, wherein the subsequent comment polling request is sent after a designated time interval.

3. The method of claim 1, wherein causing display of the reviewer comments made in the shared document includes causing display of the reviewer comments in a reviewer comment panel displayed adjacent to but not covering content of the source document.

4. The method of claim 1, wherein causing display of the reviewer comments made in the shared document includes updating display of content of the source document to include one or more content changes made by a reviewer.

5. The method of claim 1, wherein associating the logical link with the source document includes storing the logical link with the source document.

6. The method of claim 1, wherein generating, associating, and causing are carried out by an executable module that is downloadable to the author computing system.

7. The method of claim 1, wherein
    the author computing system has installed thereon a source tool that is a platform-dependent software application available via a cloud-based subscription service, and
    the reviewer comments are provisioned in the shared document via a collaboration tool that is a platform-independent software application.

8. The method of claim 1, wherein:
    the author computing system has installed thereon a source tool that is a platform-dependent software application;
    when the source document is open at the author computing system, the source tool is capable of at least one of adding a new comment, and sending a reply to one or more of the displayed reviewer comments; and
    the method further comprises initiating propagation of a communication from the author computing system to one or more collaboration tools, the communication comprising the added new comment, the reply, or both the added new comment and the reply.

9. A computer program product including one or more non-transitory machine readable mediums encoded with instructions that when executed by one or more processors cause a process to be carried out for synchronizing comments between a source document and a shared document, the shared document having been exported from the source document, the source document having been created via a source tool and having a first format, and the shared document having a second format different from the first format, the process comprising:

sending the source document from an author computing system to a shared storage resource administered by a cloud-based service;

after the source document has been sent to the shared storage resource, sending, from the author computing system, to the shared storage resource, a first query for a source document asset ID, wherein the first query includes an access token associated with a user of the author computing system and a location of the source document in the shared storage resource;

after the source document has been sent to the shared storage resource, sending, from the author computing system, to the shared storage resource, a second query for a shared document asset ID, wherein the second query includes the access token, such that the first and second queries include the same access token;

receiving, at the author computing system, from the shared storage resource, the source document asset ID and the shared document asset ID, wherein the source document asset ID uniquely identifies the source document, wherein the shared document asset ID uniquely identifies the shared document, and wherein the source and shared document asset IDs are generated and assigned to their respective documents by the shared storage resource;

generating, at the author computing system, a logical link between the source document and the shared document, the logical link including the shared document asset ID and the source document asset ID received from the shared storage resource;

associating the logical link with the source document;

opening the source document at the author computing system;

reading the shared document asset ID from the logical link that is associated with the source document;

sending a comment polling request from the author computing system to a review commenting tool administered by the cloud-based service, wherein the comment polling request includes the shared document asset ID read from the logical link;

receiving, at the author computing system, from the review commenting tool, one or more reviewer comments made in the shared document; and causing display of the reviewer comments made in the shared document in a display of the author computing system.

10. The computer program product of claim 9, wherein the process further comprises sending a subsequent comment polling request from the author computing system to the review commenting tool, wherein the subsequent comment polling request is sent after a designated time interval.

11. The computer program product of claim 9, wherein causing display of the reviewer comments made in the shared document includes causing display of the reviewer comments in a reviewer comment panel displayed adjacent to but not covering content of the source document.

12. The computer program product of claim 9, wherein causing display of the reviewer comments made in the shared document includes updating display of the source document to include one or more content changes made by a reviewer.

13. The computer program product of claim 9, wherein associating the logical link with the source document includes storing the logical link with the source document.

14. The computer program product of claim 9, wherein generating, associating, and causing are carried out by an executable module that is downloadable to the author computing system.

15. The computer program product of claim 9, wherein
the author computing system has installed thereon a source tool that is a platform-dependent software application available via a cloud-based subscription service, and
the reviewer comments are provisioned in the shared document via a collaboration tool that is a platform-independent software application.

16. The computer program product of claim 9, wherein:
the author computing system has installed thereon a source tool that is a platform-dependent software application;
when the source document is open at the author computing system, the source tool is capable of at least one of adding a new comment, and providing a reply to one or more of the displayed reviewer comments; and
the process further comprises initiating propagation of a communication from the author computing system to one or more collaboration tools, the communication comprising the added new comment, the reply, or both the added new comment and the reply.

17. An author computing system for synchronizing comments between a source document and a shared document, the source document having been created via a source tool and having a first format, and the shared document having a second format different from the first format, the author computing system comprising:

a display;

one or more computer memories encoded with instructions; and one or more processors configured to execute the instructions, thereby causing operations comprising
send the source document to a shared storage resource administered by a cloud-based service,
after the source document has been sent to the shared storage resource, send, to the shared storage resource, a first query for a source document asset ID, wherein the first query includes an access token associated with a user of the author computing system and a location of the source document in the shared storage resource,
after the source document has been sent to the shared storage resource, send, to the shared storage resource, a second query for a shared document asset ID, wherein the second query includes the access token, such that the first and second queries include the same access token,
receive the source document asset ID and the shared document asset ID from the shared storage resource, wherein the source document asset ID uniquely identifies the source document, wherein the shared document asset ID uniquely identifies the shared document, and wherein the source and shared document asset IDs are generated and assigned to their respective documents by the shared storage resource,
generate a logical link between the source document and the shared document, the logical link including the shared document asset ID and the source document asset ID received from the shared storage resource, associate the logical link with the source document, open the source document at the author computing system, read the shared document asset ID from the logical link that is associated with the source document, send a comment polling request from the author computing system to a review commenting tool administered by the cloud-based service, wherein the comment polling request includes the shared document asset ID read from the logical link, receive, from the review commenting tool, one or more reviewer comments made in the shared document, and cause display of the reviewer comments made in the shared document in the display.

18. The system of claim 17, wherein the operations further comprise send a second comment polling request to the review commenting tool, wherein the second comment polling request is sent after a designated time interval.

19. The system of claim 17, wherein causing display of the reviewer comments made in the shared document includes at least one of causing display of the reviewer comments in a reviewer comment panel displayed adjacent to but not covering content of the source document; and updating display of content of the source document to include one or more content changes made by a reviewer.

20. The system of claim 17, wherein the source tool is a platform-dependent software application available via a cloud-based subscription service, and wherein the reviewer comments are provisioned in the shared document via a collaboration tool that is a platform-independent software application.

* * * * *